United States Patent [19]

Meyer

[11] 4,122,069

[45] Oct. 24, 1978

[54] POLYETHER DIHYDROXYALKYL CARBAMATE EPOXY ADDITIVE FOR EPOXY RESINS

[75] Inventor: Lee G. Meyer, Austin, Tex.

[73] Assignee: Texaco Development Corporation, New York, N.Y.

[21] Appl. No.: 786,751

[22] Filed: Apr. 11, 1977

[51] Int. Cl.² ............................................. C08G 59/56
[52] U.S. Cl. ................................ 528/93; 260/830 R; 528/132; 528/94; 528/111; 528/122; 528/123; 528/124
[58] Field of Search ............ 260/47 EN, 2 N, 59 EP, 260/830 R

[56] References Cited

U.S. PATENT DOCUMENTS

| 3,380,881 | 4/1968 | Williamson et al. ................. 161/185 |
| 3,406,131 | 10/1968 | Kuhlkamp et al. ................... 260/2.5 |
| 3,462,393 | 8/1969 | Legler ..................................... 260/47 |
| 3,730,908 | 5/1973 | Harvey ................................. 252/426 |

*Primary Examiner*—Harold D. Anderson
*Assistant Examiner*—E. A. Nielsen
*Attorney, Agent, or Firm*—Carl G. Ries; Thomas H. Whaley

[57] ABSTRACT

The adhesion properties of amine-cured epoxy resins are unexpectedly enhanced by addition of certain dihydroxyalkyl carbamate terminated polyether additives. The adhesively superior epoxy resin composition comprises a vicinal polyepoxide, a curing amount of an amine curing agent, and an effective amount of a polyether dicarbamate having terminal hydroxyalkyl carbamate groups and a molecular weight of from about 2000 to about 3000.

17 Claims, No Drawings

POLYETHER DIHYDROXYALKYL CARBAMATE EPOXY ADDITIVE FOR EPOXY RESINS

BACKGROUND OF THE INVENTION

1. Field of the Invention

This invention relates to curable epoxy resins having increased adhesive strength; and, more particularly, to amine cured epoxy resins containing certain di-hydroxyalkyl carbamate terminated polyether additives.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the amines. The most commonly used amine curing agents are aliphatic amines such as diethylenetriamine, triethylenetetramine and the like and/or polyoxyalkylene polyamines; such as polyoxypropylene diamines and triamines.

Epoxy resin compositions having impproved physical properties are obtained by employing polyoxyalkyleneamines, and polyoxyalkylenediamines in particular, as curing agents. It is common to employ with such epoxy resin compositions a co-curing agent such as those described in U.S. Pat. No. 3,549,592.

Also known to be effective as epoxy curing agents or co-curing agents are various ureas and substituted ureas, such as those disclosed in U.S. Pat. Nos. 3,294,749; 2,713,569; 3,386,956; 3,386,955; 2,855,372 and 3,639,338. The ureas disclosed in the above references are useful as either curing agents or as curing accelerators.

It has now been unexpectedly found that a specific di-hydroxyalkyl carbamate terminated polyoxyalkylene material having a molecular weight of from about 2000 to about 3000, when employed as an epoxy additive, provides cured epoxy resin compositions exhibiting outstanding strength of adhesion. Specifically, epoxy resins incorporating these additives, upon curing with an amine, provide a material with high tensile shear strength and superior adhesion to substrates.

SUMMARY OF THE INVENTION

According to the broad aspect of the instant invention, the adhesive strength of amine-cured epoxy resins is enhanced by the addition of an effective amount of a polyether carbamate having terminal di-hydroxyalkyl carbamate groups and having a molecular weight of from 2000 to about 3000.

In one aspect, a curable epoxy resin composition having superior adhesive strength comprises a vicinal polyepoxide, a curing amount of an amine curing agent and an effective amount of the polyether di-carbamate additive.

In accordance with a preferred embodiment, a di-glycidyl ether of 4,4'-isopropylidene bisphenol, a curing amount of a primary amine-containing curing agent consisting essentially of a polyoxypropylene polyamine having a molecular weight of from about 200 to 500, a piperazine-amino alkanol accelerator and an effective amount of a polyether dicarbamate having terminal hydroxyalkyl carbamate groups and a molecular weight of about 2000 are utilized to form a resin.

DETAILED DESCRIPTION OF THE INVENTION

According to the instant inventive concept, blends of a polyepoxide, an amine curing agent and the di-hydroxyalkyl carbamate terminated polyether containing compounds and, optionally, an accelerator are thoroughly admixed and cured in accordance with conventional methods to provide cured epoxy resins having unexpectedly superior adhesive strength.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novalak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol e.g., phenol itself, or a polyhydric phenol. Further details concerning the nature and preparation of these epoxy novalak resins can be obtained in Lee, H. and Neville, K., *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

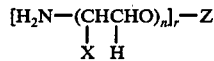

wherein X is hydrogen, a methyl radical or an ethyl radical; Z is a hydrocarbon radical having 2 to 5 carbon atoms forming from 2 to 4 external ether linkages; $n$ is a number from 1 to about 15 and $r$ is a number from 2 to 4. The most preferred polyoxyalkylene polyamines are the polyoxypropyl diamines wherein X is a methyl radical, $n$ is a number from 1 to 10, Z is a 1,2-propylene radical and $r$ is about 2. These polyoxyalkylene polyamines can be prepared by known methods as disclosed in U.S. Pat. Nos. 3,236,895 and 3,654,370. The most preferred polyoxyalkylene polyamine is a polyoxypropylene diamine having a molecular weight of about 230.

Another preferred class of polyoxyalkylene polyamines can be depicted by the formula:

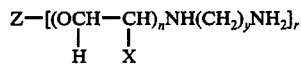

wherein X, Z, $n$ and $r$ are defined as above and $y$ is 2 or 3. These poly(aminoalkylamino)polyethers are the hydrogenated product of the cyanoalkylated adduct of a polyoxyalkylene polyamine as above described. The preparation of the cyanoalkylated adducts is described in U.S. Pat. No. 3,666,788 issued to Rowton, May 30, 1972.

Preferred such compounds are the hydrogenated cyanoethylated polyoxypropylene triamines.

The dicarbamate terminated polyether additive can generally be described as polyoxyalkylene containing materials having terminal hydroxyalkyl carbamate groups and a molecular weight of from about 2000 to about 3000. More specifically, these compounds are polyoxyalkylene compounds having terminal hydroxyalkyl carbamate groups, of the formula:

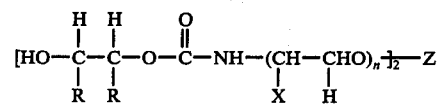

wherein each R is, independently, hydrogen; or, a branched or straight chain alkyl radical of from 1 to about 6 carbon atoms, and more preferably from 1 to about 4; X is hydrogen, a methyl radical or an ethyl radical; Z is a hydrocarbon alkylene radical having 2 to 5 carbon atoms and $n$ is a number selected such that the molecule of the above formula has a molecular weight of from about 2000 to 3000. The preferred polyoxyalkylene compounds are of the above formula wherein R is hydrogen or a lower alkyl group, and more preferably a lower alkyl group of from 1 to about 4 carbon atoms; X is a methyl radical; Z is a 1,2-propylene radical; and $n$ is a number from 16 to 19. Preferred lower alkyl groups include methyl, ethyl, n-propyl and n-butyl.

The polyether dicarbamate compounds are formed by the reaction of a hydroxyalkyl carbamate compound with a polyoxyalkylene diamine having a molecular weight value such that the resultant dihydroxyalkyl carbamate containing product has a molecular weight of from about 2000 to about 3000 at temperatures in the range from about 25° C. to about 150° C. in a molar ratio of about mole of hydroxyalkyl carbamate forming compounds for each mole of terminal amine.

The diamines that are useful in forming the additives are polyoxyalkylene diamines of the formula:

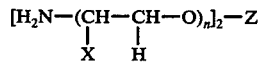

wherein X is a hydrogen, a methyl radical or an ethyl radical; Z is a hydrocarbon alkylene radical having from 2 to 5 carbon atoms; and, $n$ is an average number of from about 15 to about 25. Preferred polyoxypropylene diamines wherein X is a methyl radical, $n$ is an average number from 16 to 19, Z is a 1,2-propylene radical. These polyoxyalkylene polyamines can be prepared by known methods as disclosed in U.S. Pat. Nos. 3,236,895 and 3,654,370.

The hydroxyalkyl carbamate forming compounds are generally well known. They are generally those compounds which supply the O=C—O—CC—OH radical. Ethylene carbonate and alkyl substituted ethylene carbonates are the preferred compounds.

In accordance with the method of forming the polyether carbamate, the reactants are simply admixed in correct molar ratios in a suitable reaction vessel and heated until the reaction occurs.

The functionality of the polyoxyalkylenepolyamine is dependent upon the number of terminal primary amino groups which in the instant case is preferably 2. It will be realized that each mole of hydroxyalkyl carbamate forming compound will react with a single terminal primary amino group of the polyoxyalkylenepolyamine. It is particularly important that, in forming the additive compounds of the instant invention, a specific molar ratio of reactants be maintained. Specifically, about 1 mole of hydroxyalkyl carbamate forming compound for each amino group of the polyoxyalkylenepolyamine is required. Thus, with the diamine, about 2 moles of hydroxyalkyl carbamate forming compound is utilized. Preferably the instant reaction is carried out in the presence of a slight excess of the hydroxyalkyl carbamate forming compound to assure complete conversion of the amino groups.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Many accelerators are known in the art which can be utilized in accordance with the instant invention. Examples include salts of phenols: salicyclic acids: amine salts of fatty acids such as those disclosed in U.S. Pat. Nos. 2,681,901; and, tertiary amines such as those disclosed in 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesion properties of prior art amine-cured epoxy resins are enhanced by the addition of an effective amount of a polyether dicarbamate having terminal hydroxyalkyl carbamate groups and a molecular weight of from about 2000 to about 3000 as hereinbefore described. The amount of additive effective in bringing about the increase adhesive property is somewhat empirical and will depend upon the resin, the amine curing agent, and the use of an accelerator. Generally, the dicarbamate additive can be utilized in amounts from about 5 to about 50 parts by weight based on one hundred parts by weight of the resin constituent.

Although somewhat empirical, the exact amount of additive used to increase adhesion can readily be determined without undue experimentation owing to the fact that a resin mixture containing an effective amount of the additive will undergo changes which are readily visible as curing proceeds. Specifically, the curing resin takes on an opaque, milky white appearance that becomes more pronounced during curing and results in a product which has a lustrous white appearance. It will be realized that, advantageously, this optical absorption shift enhances the beauty of cast objects and negates the need to use white pigments or fillers.

Preferably the adhesive properties of prior art resins are enhanced by addition of an effective amount of the polyoxypropylene dicarbamate additive based upon the condensation of 2 moles ethylene carbonate with 1 mole of a polyoxypropylenediamine having molecular weight of about 2000. The preferred resins comprise polyglycidyl ethers of a polyhydric phenols cured by incorporating therein a curing amount of a polyoxyalkylenepolyamine of molecular weight from about 200 to 500 and an accelerator combination of piperazine and an alkanolamine, the combination having a combined weight ratio of between about 1:8 to 1:1. Exemplary preferred prior art compositions can be enhanced in accordance with the instant invention are disclosed in U.S. Pat. No. 3,943,104 issued Mar. 9, 1976 to G. Waddill.

The curable epoxy resin compositions of the instant invention generally comprise a vicinal polyepoxide, a curing amount of an amine curing agent and an effective amount of the polyether dicarbamate additive. Optionally an accelerator can be added.

The amine cured resins having superior adhesion in accordance with the instant invention are prepared in a conventional manner. The amine curing agent is admixed with the polyepoxide composition in amounts according to the amine equivalent weight of the curing agent employed. Generally the number of equivalents of amine groups is from about 0.8 to about 1.2 times the number of epoxide equivalents present in the curable epoxy resin composition, with a stoichiometric amount being preferred. When using an accelerator, amounts from 1 to about 10 parts by weight based on 100 parts by weight of the resin are generally satisfactory. The exact amount of constituents in accordance with the above general requirements will depend primarily on the application for which the cured resin is intended.

The dicarbamate additive is incorporated into the uncured resin by admixing. Preferably, the additive is first admixed with the curing agent and/or the accelerator prior to addition to the resin. The constituents forming the curable material and then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material, especially the adhesive strength.

Likewise, although all of the disclosed amine curing agents are generally useful to cure the resin it has been found that those resins containing curing agents wherein the amino moieties are separated by large aliphatic or oxyalkylene chains do not demonstrate a substantial increase in adhesive strength in the presence of the dihydroxyalkyl carbamate terminated additives. The exact reason for this is not fully understood. For example, resins cured with polyoxypropylenediamine having molecular weights of above about 400, do not demonstrate greatly enhanced adhesive strengths in the presence of otherwise effective amounts of the additives.

Preferred amine curring agents are those polyamines having amine equivalent weight of from 20 to about 70. Examples of such agents include polyoxypropylenediamines having a molecular weight in the range of 200 to 300 and polyoxypropylenepolyamines having a molecular weight of from about 400 to 600.

It will be realized that those amine curing agents which are less effective in providing the adhesively superior resins can readily be avoided by the skilled artisan without undue experimentation, since such agents do not effectuate the "optical shift".

In accordance with a preferred embodiment, a curable resin comprises a diglycidyl ether of 4,4'-isopropylidene bisphenol; a curing amount of a primary amine-containing curing agent consisting essentially of a polyoxypropylene diamine having a molecular weight of from about 200 to 250, an accelerator of piperazine and a triethanolamine in a weight ratio of 3 to 7; and, an effective amount of a polyether dicarbamate having terminal hydroxyalkyl carbamate groups and a molecular weight of about 2000.

According to a greatly preferred embodiment, stoichiometric amounts of the resin and curing/accelerator composition are utilized. This amount is calculated by adding together the number of equivalents on the basis of weight per replaceable N-H group in the sum of the polyoxyalkylene polyamine, piperazine and alkanolamine components utilized. More preferably, based on the above calculations, the curing agent/accelerator components are utilized in amounts which provide up to about a 10% excess of the stoichiometric amount required based on the resin.

A preferred ratio of constituents comprises from about 1 to about 5 parts by weight, per one hundred parts by weight of the resin, of a piperazine-alkanolamine accelerator in a weight ratio of between about 1:8 and about 1:1 piperazine to alkanolamine. The above amount of accelerator is admixed with a polyoxyalkylenediamine curing agent in amounts of from about 10 to 50 parts by weight accelerator to 100 parts by weight of the polyoxyalkylene polyamine curing agent.

Generally, the mixture of epoxy resin, the polyether dicarbamate, polyoxyalkylenepropylene polyamine, and the accelerator combination of piperazine and alkanolamine is allowed to self-cure at ambient temperatures of between 0° C. to about 45° C. However, it has been found expedient that the mixture be cured or post-cured at elevated temperatures of up to about 135° C.

According to a greatly preferred embodiment, resins of the polyglydicyl ether of polyhydric phenol type are cured by incorporating therein about a stoichiometric amount of a polyoxyalkylenepolyamine having a molecular weight of about 230; from about 5 to 40 parts by weight of the polyether dihydroxyalkyl carbamate terminated polyoxyalkylenepolyamine having a molecular weight of about 2000; and from 1 to 5 weight percent based on 100 parts by weight of the resin of an accelerator comprising a 30:70 weight percent admixture of piperazine:triethanolamine. The composition is cured at room temperature (about 25° C.) to produce products having superior adhesive strength in accordance with the instant invention.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used. One outstanding feature of the instant composition resides in the fact that they are opaque upon curing and give a smooth, white lustrous surface which may be of particular benefit for certain molding and casting operations. The compositions of the instant invention can be used as impregnants, surface coatings, pottings, capsulating compositions, laminants, and, particularly and most importantly, as adhesives for bonding metallic elements or structures permanently together.

The following examples illustrate the nature of the instant invention but are not intended to be limitative thereof.

EXAMPLE I

In this example a polyether dihydroxyalkyl carbamate terminated additive for use in accordance with the instant invention, was prepared. Into a suitable reaction vessel, equipped with stirring apparatus, were added 1370 grams (0.72 moles) of a polyoxypropylenepolyamine having a molecular weight of approximately 2000, and an analysis of 1.01 milliequivalents (meq.) primary amine/g sold under the tradename "JEFFAMINE ®D-2000" by Jefferson Chemical Co., Austin, Texas 78751 and 130 grams of ethylene carbonate (1.48 moles). The admixture was heated for several hours at 135°–150° C. The crude reaction product was then vacuum stripped at 130°–175° C./1.4 mm Hg. Product analysis showed total amine 0.21 meq/g, primary amine 0.19 meq/g, hydroxyl number 37.6.

To illustrate the advantage of the polyether carbonate additives of this invention, various epoxy formulations employing diglycidyl ether of 4,4'-isopropylidene bisphenol were cured with various known polyamine curing agents. Where indicated a commercial accelerator was utilized. Three drops of silicone fluid were added to each formulation to prevent formation of voids and bubbles. After degassing under vacuum, the formulations were cured under the conditions indicated. In appropriate examples, the cured products were subjected to standard American Society for Testing Materials (ASTM) tests for Izod impact strength (ASTM designation D-256), flexural strength and modulus of elasticity in flexure (ASTM designation D-790-66), tensile strength and elongation at break (ASTM designation D-638-64 T), deflection temperature (ASTM designation D-648-56) and hardness (ASTM designation 2240-64 T) and/or hardness Shore D, and peel strength (ASTM D-903). The tensile shear strength (ASTM D-1002-64) was measured on adhesive bonds. All substrates were aluminum panels (No. 2024-T-3 alloy, 16 gage), degreased, then chromic acid etched prior to bonding. The abbreviations in the tables, pbw, psi and g. stand for parts by weight, pounds per square inch and grams, respectively.

EXAMPLES II–VI

In these examples epoxy resins were prepared wherein diglycidyl ether of 4,4'-isopropylidene bisphenol was cured with a polyoxypropylenediamine curing agent of m.w. 230 having an equivalent weight of 58 to which were added the indicated amounts of the dicarbonate prepared in Example I. The resulting resins were used to bond aluminum to aluminum and the resultant subjected to the ASTM tests herein described. The data, which are for comparative purposes only, is presented in the following Table I.

TABLE I

| Formulation | Examples | | | | |
|---|---|---|---|---|---|
| | 2 | 3 | 4 | 5 | 6 |
| Epoxide, pbw (Eq.190) | 100 | 100 | 100 | 100 | 100 |
| Curing agent, pbw[1] | 30 | 30 | 30 | 30 | 30 |
| Dicarbonate, pbw[2] | 0 | 2 | 5 | 10 | 20 |
| Tensile shear, psi[3] | 980 | 1240 | 2830 | 3820 | 3770 |
| Peel strength[3] | 7.6 | 5.2 | 6.8 | 16.0 | 23.7 |

[1]Sold by Jefferson Chemical Company, Austin, Texas 78751 under the name "JEFFAMINE®D-230"
[2]The product of Example I
[3]Cure: 7 days, Room Temp.

This example demonstrates the improved adhesion strength of the epoxy formulation when amounts of the bisureide are added to an epoxy formulation cured with a polyoxypropylenediamine of m.w. 230.

EXAMPLES VII-IX

In these examples the dicarbamate prepared in Example I was added to an epoxy system cured with triethylenetetramine at room temperature and compared with a control system cured under the same conditions but without the additive. The formulations and properties of the cured resins are shown in Table II below. Considerable improvement in bond strength can be observed in the resin which included the dicarbamate.

TABLE II

| Formulation | Examples | | |
|---|---|---|---|
| | 7 | 8 | 9 |
| Epoxy, pbw (Eq.190) | 100 | 100 | 100 |
| Triethylenetetramine, pbw | 12 | 12 | 12 |
| Dicarbamate, pbw[1] | — | 5 | 10 |
| Tensile shear strength, psi[2] | 800 | 1520 | 1500 |

[1]Product of Example I
[2]Cures at room temperature for 7 days

EXAMPLES X-XV

In this example the diureide prepared in Example I was added in varying amounts to amine cured systems. In two runs a polyoxypropylenediamine of m.w. 400 and an amine equivalence of 105 was used and in two others a polyoxypropylenetriamine of m.w. 400 with an amine equivalence of about 70. The results are shown in Table III below.

TABLE III

| Formulation | Examples | | | | | |
|---|---|---|---|---|---|---|
| | 10 | 11 | 12 | 13 | 14 | 15 |
| Epoxy, pbw (Eq. 190) | 100 | 100 | 100 | 100 | 100 | 100 |
| Curing agent (diamine) pbw[1] | 50 | 50 | 50 | — | — | — |
| Curing agent (triamine) pbw[2] | — | — | — | 45 | 45 | 45 |
| Dicarbamate, pbw[3] | 0 | 10 | 20 | 10 | 20 | 0 |
| Tensile shear strength, psi[4] | 2500 | 2660 | 2200 | 3030 | 3500 | 1400 |

[1]Polyoxypropylenediamine sold under the tradename JEFFAMINE®D-400 by Jefferson Chemical Company, Austin, Texas 78751
[2]Polyoxypropylenetriamine sold under the tradename JEFFAMINE T-403 by Jefferson Chemical Company, Austin, Texas 78751
[3]Product of Example I
[4]Cured for 7 days at room temperature This example shows that the additive is less effective in increasing adhesive strength when used in resins wherein polyether polyamine curing agents having an equivalence over about 70 is used.

EXAMPLES XVI-XVIII

In these examples the dicarbamate of Example I was added to an epoxy system containing a diethylene glycol bis(propylamine) curing agent sold under the tradename "ZZL-0822" by Union Carbide. The formulations and properties of the cured resins are shown in Table IV below.

TABLE IV

| | Examples | | |
|---|---|---|---|
| | 16 | 17 | 18 |
| Epoxy (Eg. 190) | 100 | 100 | 100 |
| Diethylene glycol bis(propylamine)[1] | 30 | 30 | 30 |
| Dicarbamate[2] | — | 5 | 10 |
| Tensile shear, psi | 1570 | 3280 | 3530 |

[1]Sold by Union Carbide Corporation, N.Y., N.Y. 10017 under the tradename "ZZL-0822".
[2]Product of Example I.

This example demonstrates the improved adhesive strength of the epoxy cured with the additive over the epoxy cured with the diethylene glycol bis(propylamine) alone.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. An epoxy resin composition having superior adhesion properties and being the cured product of a curable admixture which comprises:
   a vicinal polyepoxide having an epoxide equivalency of greater than 1.8;
   a curing amount of a polyamine curing agent having at least 3 reactive amino hydrogens; and,
   an effective amount of an additive consisting essentially of a polyoxyalkylene dicarbamate having terminal dihydroxyalkyl carbamate groups and a molecular weight from about 2000 to about 3000.

2. The composition of claim 1 further comprising an effective amount of a composition effective in accelerating the cure.

3. The composition of claim 2 wherein said dicarbamate is of the formula

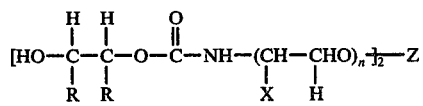

wherein each R is, independently, hydrogen; or, a branched or straight chain alkyl radical of from 1 to about 6 carbon atoms; X is hydrogen, a methyl radical or an ethyl radical; Z is a hydrocarbon alkylene radical having 2 to 5 carbon atoms and $n$ is a number selected such that the molecule of the above formula has a molecular weight of from about 2000 to about 3000.

4. The composition of claim 3 wherein each r is, independently, hydrogen or an alkyl group having from 1 to about 4 carbon atoms; X is a methyl radical, Z is a 1,2-propylene radical; and $n$ is an average number from 16 to 19.

5. The composition of claim 3 wherein each R is, independently, hydrogen.

6. The composition of claim 4 wherein each R is, independently, a lower alkyl radical selected from the group consisting of methyl, ethyl, n-propyl and n-butyl.

7. The composition of claim 2 wherein said vicinal polyepoxide is more than 80% by weight of a polyglycidyl ether of polyhydric phenols, wherein said polyamine curing agent is a polyoxyalkylene polyamine.

8. The composition of claim 7 wherein said vicinal polyepoxide is a polyglycidyl ether of a polyhydric phenol; wherein said polyamine curing agent is a polyoxyalkylene polyamine having an amine equivalent weight of from 20 to about 70.

9. The composition of claim 8 wherein said curing agent is selected from polyoxyalkylene polyamines of the formula:

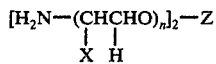

wherein X is hydrogen, a methyl radical or an ethyl radical; Z is a hydrocarbon radical having 2 to 5 carbon atoms forming from 2 to 4 external ether linkages; $n$ is a number from 1 to about 15 and $r$ is a number from 2 to 4; or, the formula:

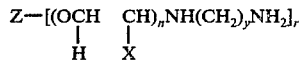

wherein X, Z, $n$ and $r$ are defined as above and $y$ is 2 or 3.

10. A method for increasing the adhesive strength of an epoxy resin composition, being the cured product of a curable admixture comprising a vicinal polyepoxide having an epoxide equivalency of greater than 1.8; and, a curing amount of a polyamine curing agent having at least 3 reactive amino hydrogens comprising the step of:
adding to said curable admixture an effective amount of a polyoxyalkylene dicarbamate additive having a molecular weight of about 2000 to about 3000.

11. The method of claim 10 wherein said dicarbamate is of the formula

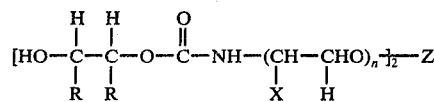

wherein each R is, independently, hydrogen; or, a branched or straight chain alkyl radical of from 1 to about 6 carbon atoms; X is hydrogen, a methyl radical or an ethyl radical; Z is a hydrocarbon alkylene radical having 2 to 5 carbon atoms and $n$ is a number selected such that the molecule of the above formula has a molecular weight of from about 2000 to about 3000.

12. The method of claim 11 wherein each R is, independently, hydrogen or a lower alkyl; X is a methyl radical; Z is a 1,2-propylene radical; and $n$ is an average number from 16 to 19.

13. The method of claim 12 wherein each R is, independently, hydrogen.

14. The method of claim 13 wherein said curable admixture further comprises an effective amount of a composition effective in accelerating the cure.

15. The method of claim 13 wherein said curing agent is selected from polyoxyalkylene polyamines of the formula:

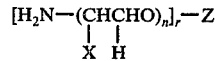

wherein X is hydrogen, a methyl radical or an ethyl radical; Z is a hydrocarbon radical having 2 to 5 carbon atoms forming from 2 to 4 external ether linkages; $n$ is a number from 1 to about 15 and $r$ is a number from 2 to 4; or, the formula:

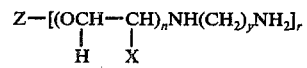

wherein X, Z, $n$ and $r$ are defined as above and $y$ is 2 or 3.

16. A curable resin composition comprising a diglycidyl ether of 4,4'-isopropylidene bisphenol polyepoxide; a curing amount of a primary amine-containing curing agent consisting essentially of a polyoxypropylene diamine having a molecular weight of from about 200 to 250, an accelerator of piperazine and a triethanolamine in a weight ratio of 3 to 7; and, an effective amount of a polyoxyalkylene dicarbamate having terminal dihydroxyalkyl carbamate groups and a molecular weight of about 2000.

17. The resin of claim 16, wherein said primary amine-containing curing agent is present in about a stoichiometric amount; said accelerator is present in amount from about 1 to 5 parts by weight based on 100 parts by weight said polyepoxide, said additive is present in amount from about 5 to 40 parts by weight based on 100 parts by weight of said polyepoxide.

* * * * *